United States Patent [19]

Donahue et al.

[11] Patent Number: 5,383,429
[45] Date of Patent: Jan. 24, 1995

[54] HYPEREUTECTIC ALUMINUM-SILICON ALLOY CONNECTING ROD FOR A TWO-CYCLE INTERNAL COMBUSTION ENGINE

[75] Inventors: Raymond J. Donahue, Fond du Lac; Terrance M. Cleary, Allenton; Terry D. Stinson, Oakfield, all of Wis.

[73] Assignee: Brunswick Corporation, Lake Forest, Ill.

[21] Appl. No.: 200,640

[22] Filed: Feb. 23, 1994

[51] Int. Cl.6 ............................ F02F 7/00; G05G 1/00
[52] U.S. Cl. ............................ 123/197.3; 74/579 E; 420/534
[58] Field of Search .................... 123/197.3; 74/579 R, 74/579 E; 420/534, 537, 538, 541

[56] References Cited

U.S. PATENT DOCUMENTS

| | | | |
|---|---|---|---|
| 2,995,953 | 8/1961 | Fazi | 74/579 E |
| 3,238,811 | 3/1966 | Longstreth | 74/579 E |
| 3,333,579 | 8/1967 | Shockley et al. | |
| 3,536,123 | 10/1970 | Izumi | 164/114 |
| 4,113,473 | 9/1978 | Gauvry et al. | 75/148 |
| 4,139,045 | 2/1979 | Vitt | 164/34 |
| 4,603,665 | 8/1986 | Hesterberg et al. | 123/195 |
| 4,693,292 | 9/1987 | Campbell | 164/34 |
| 4,821,694 | 4/1989 | Hesterberg et al. | 123/195 |
| 4,902,475 | 1/1990 | Apelain | 420/548 |
| 4,966,220 | 10/1990 | Hesterberg et al. | 164/34 |
| 4,969,428 | 11/1990 | Donahue et al. | 123/195 |
| 5,129,378 | 7/1992 | Donahue et al. | 123/193.4 |
| 5,154,098 | 10/1992 | Maumus | 74/579 E |
| 5,234,514 | 8/1993 | Donahue et al. | 420/534 |
| 5,240,519 | 8/1993 | Kamio et al. | 420/534 |

Primary Examiner—Andrew M. Dolinar
Assistant Examiner—M. Macy
Attorney, Agent, or Firm—Andrus, Sceales, Starke & Sawall

[57] ABSTRACT

A connecting rod for a two-cycle internal combustion engine that is composed of a hypereutectic aluminum-silicon alloy containing more than 12% silicon. The alloy contains precipitated particles of silicon having an average particle size less than 50 microns. In contrast to a hypoeutectic aluminum silicon alloy containing less than 12% silicon, the hypereutectic aluminum-silicon alloy has an endurance limit, so that at stresses below about 15,000 psi there will be no failure of the alloy at multiple cycles, making the alloy suitable for use as a connecting rod in a two-cycle engine, which is only subjected to compressive stress in service.

7 Claims, 2 Drawing Sheets

356 HYPOEUTECTIC ALUMINUM – SILICON ALLOY

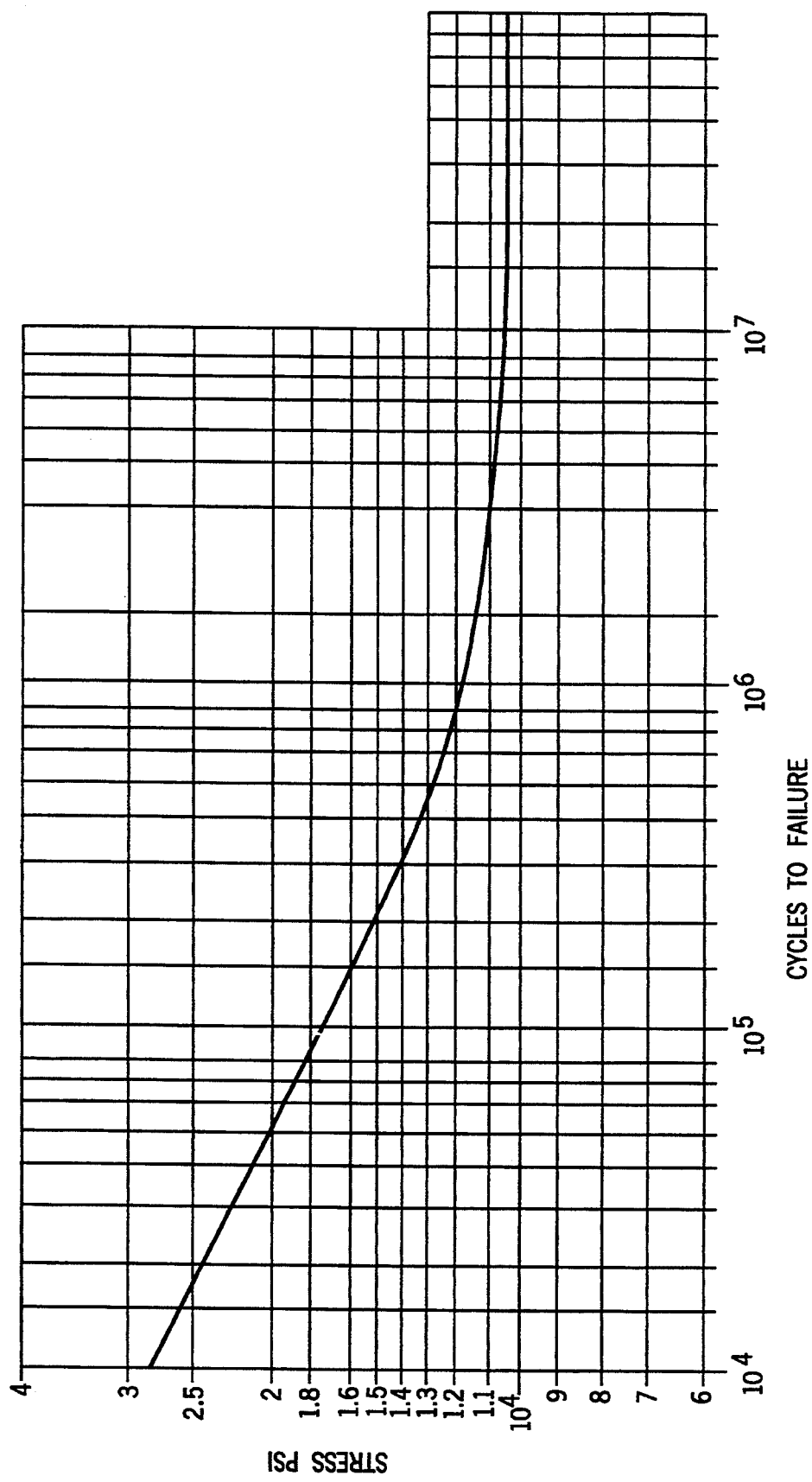
FIG. 2  HYPEREUTECTIC ALUMINUM – SILICON ALLOY

HYPEREUTECTIC ALUMINUM-SILICON ALLOY CONNECTING ROD FOR A TWO-CYCLE INTERNAL COMBUSTION ENGINE

BACKGROUND OF THE INVENTION

Hypoeutectic aluminum-silicon alloys contain less than about 12% silicon and have a microstructure consisting of aluminum dendrites in a eutectic. Alloys of this type have a relatively high tensile strength and good ductility. However, hypoeutectic aluminum-silicon alloys lack wear resistance, and as a consequence have not been used in applications where wear resistance is a prime necessity.

Hypereutectic aluminum-silicon alloys, those containing in excess of about 12% silicon, contain precipitated primary silicon particles embedded in a eutectic matrix consisting of continuous phases of aluminum and silicon. Because of the presence of the precipitated silicon particles, alloys of this type have good wear resistance, but the tensile strength, as well as the ductility is less than the hypoeutectic aluminum-silicon alloys.

It has been recognized that the lighter weight and heat transfer properties make aluminum alloys the logical choice as a material for internal combustion engines. Because of this and due to their relatively high tensile strength and ductility, hypoeutectic aluminum-silicon alloys have been used in the past to cast engine components, such as engine blocks and cylinder heads. While it would also be desirable to construct connecting rods of the engine of a hypoeutectic aluminum-silicon alloy because of its relatively high tensile strength, it has been found that these alloys exhibit poor high cycle fatigue strength and do not have an endurance limit, meaning that the alloy will ultimately fail at high cycles. The poor high cycle fatigue strength of hypoeutectic aluminum-silicon alloys is believed to be due to the primary aluminum dendrites that are fixed in the microstructure upon solidification of the alloy and do not change upon subsequent heat below the solidus temperature. Therefore, due to its poor high cycle fatigue strength, hypoeutectic aluminum-silicon alloys have not been considered to be a candidate for connecting rods in an internal combustion engine.

Because hypoeutectic aluminum-silicon alloys have not been considered a good material for connecting rods, it has been erroneously concluded in the past that hypereutectic aluminum-silicon alloys would also be a poor choice for connecting rods, because these alloys have a lower ultimate tensile strength and ductility than the hypoeutectic alloys and it was further believed that hypereutectic aluminum-silicon alloys would follow a similar pattern and have poor high cycle fatigue strength.

SUMMARY OF THE INVENTION

The invention is based on the discovery that hypereutectic aluminum-silicon alloys containing in excess of 12% silicon have superior high cycle fatigue strength, as compared to the hypoeutectic aluminum-silicon alloys, and can be successfully used as connecting rods in a two-cycle internal combustion engine.

In a four-cycle engine, the connecting rods are subject to both tensile and compressive stress. The tensile stress occurs on the intake stroke of the piston. On the other hand, a connecting rod of a two-cycle engine is only subjected to compressive stress and is not subjected to tensile stress. Because of this, high tensile strength is not a prime requirement in a connecting rod for a two-cycle engine.

It has been further discovered that while a hypereutectic aluminum-silicon alloy has a lower ultimate tensile strength, as compared to the hypoeutectic aluminum-silicon alloys, the hypereutectic alloys have good high cycle fatigue strength and exhibit an endurance limit, meaning that below a certain stress or load, the alloy will not fail regardless of the number of cycles.

It has been further discovered that the ultimate tensile strength of the hypereutectic aluminum-silicon alloys is primarily determined by the primary silicon particle size. Large particle size primary silicon exhibits a low ultimate tensile strength, while a smaller particle size produces a higher ultimate tensile strength. Therefore, hypereutectic aluminum silicon alloys having an average primary silicon particle size of less than 50 microns are preferred. In spite of the dramatic effects of primary silicon size on the ultimate tensile strength, the primary silicon particle size has no appreciable effect on the high cycle fatigue strength of the hypereutectic alloy.

In summary, even though the hypereutectic aluminum-silicon alloys have a relatively low ultimate tensile strength, they do possess good high cycle fatigue strength and exhibit an endurance limit at lower stress levels, so that they are suitable for connecting rods in a two-cycle engine which are only subjected to compressive stress and are not subjected to tensile stress in service.

Other objects and advantages will appear in the course of the following description.

DESCRIPTION OF THE DRAWINGS

The drawings illustrate the best mode presently contemplated of carrying out the invention.

In the drawings:

FIG. 2 is a graph similar to FIG. 1 of a hypereutectic aluminum-silicon alloy showing cycles-to-failure as compared to stress.

DESCRIPTION OF THE ILLUSTRATED EMBODIMENT

Figure 1:
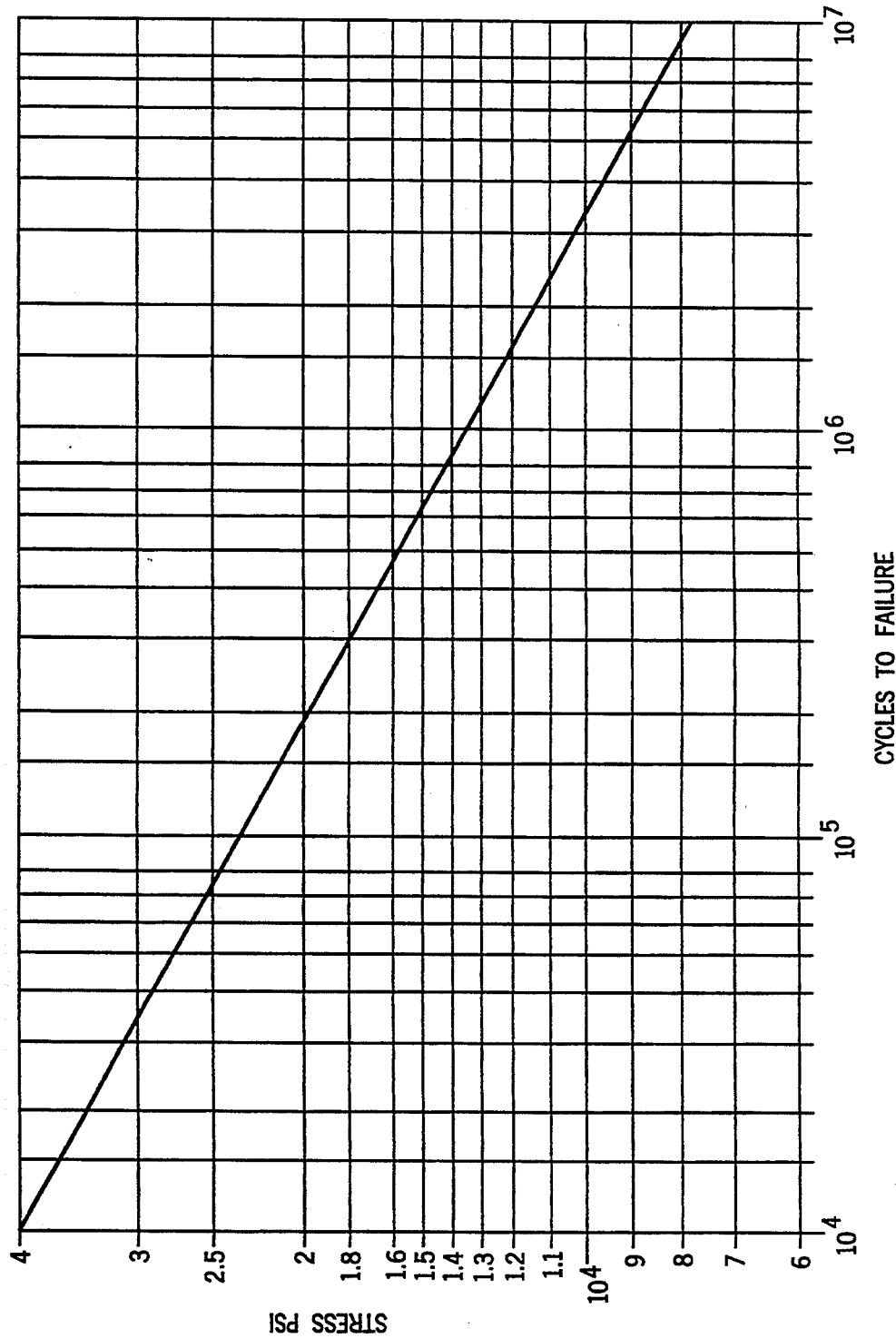
FIG. 1 is a graph of a hypoeutectic aluminum-silicon alloy showing cycles-to-failure as compared to stress.

Connecting rods in a four-cycle engine are subjected to compressive stress, as well as tensile stress on the intake stroke. Because of this, a connecting rod for a four cycle engine must have high tensile strength, as well as good high-cycle fatigue strength. In order to achieve these characteristics, connecting rods have traditionally been produced from ferrous metals.

Hypoeutectic aluminum-silicon alloys contain less than about 12% silicon, and generally in the range of about 16% to 25% silicon. Alloys of this type have been used in the past in casting engine blocks for internal combustion engines, as well as other engine components. It has been recognized that hypoeutectic aluminum-silicon alloys have a relatively high tensile strength, generally in the range of 30,000 psi to 40,000 psi, but these alloys have relatively poor high-cycle fatigue strength (i.e. they fail under a cyclic load of 9,000 psi in approximately 10,000,000 cycles), meaning that the fatigue strength will progressively decrease as the cycles increase. Further, alloys of this type do not exhibit an endurance limit and will ultimately fail at high cycles.

Even though the hypoeutectic aluminum-silicon alloys exhibit an ultimate tensile strength suitable for connecting rods and are lighter weight than ferrous alloys, they have not been considered candidates for connecting rods because of their poor high-cycle fatigue strength.

FIG. 1 is a graph comparing load or stress with the cycles-to-failure for a conventional 356 T6 hypoeutectic aluminum-silicon alloy containing 7.0% silicon, 0.10% manganese, 0.10% iron, 0.40% magnesium, 0.10% copper, and balance aluminum, and without a strontium addition. From the curve in FIG. 1 it can be seen that the stress required for failure progressively decreases with the number of cycles to which the alloy is subjected, and ultimately at high cycles, the alloy will fail. Thus, the 356 T6 hypoeutectic aluminum-silicon alloy does not exhibit an endurance limit and will ultimately fail at stress under high cycles.

It is believed that the poor high cycle fatigue stress of the hypoeutectic aluminum-silicon alloy is due to the primary aluminum dendrites that are in the micro-structure upon solidification and the dendrites do not change upon subsequent heat treatment below the solidus temperature. It has also been noted that the high cycle fatigue strength of hypoeutectic aluminum-silicon alloys is not significantly influenced by its post-solidification heat treatment. For example, the 356 T6 alloy is subjected to an aging treatment at 310° F. for a period of 4 hours, which causes the precipitation of some magnesium silicide. The 356 T7 alloy differs from the 356 T6 alloy only in the aging heat treatment and includes an age at 400° F. for a period of 4 hours, which results in the precipitation of additional quantities of magnesium silicide which coalesce into larger particles of fewer number. One would expect better high cycle fatigue strength in the T7 alloy, due to the larger particles of magnesium silicide, but it has been found that there is no significant difference in the high cycle fatigue strength between the two alloys.

Similarly, the 256 T5 alloy, having the same composition as the T6 alloy, but having no solution treatment and then aged at 350F. to remove residual stress, showed a lower ultimate tensile strength than the T6 alloy, but the high cycle fatigue stress was not changed to any significant degree over that of the T6 alloy. Therefore, it has been found that the postsolidification heat treatment of hypoeutectic aluminum silicon alloys does not significantly alter the high cycle fatigue strength and all of these alloys, regardless of their heat treatment, do not exhibit an endurance limit and will ultimately fail when cycled under load or stress.

As the hypoeutectic aluminum-silicon alloys exhibit poor high cycle fatigue strengths, these alloys have not been considered as a material for connecting rods in an internal combustion engine.

Because hypoeutectic aluminum-silicon alloys have not been considered a suitable material for a connecting rod, it has erroneously been concluded that hypereutectic aluminum-silicon alloys would also be a poor choice for a connecting rod, because these alloys have a lower ultimate tensile strength and reduced ductility, as compared to the hypoeutectic aluminum-silicon alloys. However, it has been discovered through the invention, that unlike the hypoeutectic aluminum-silicon alloys, the hypereutectic aluminum-silicon alloys exhibit an endurance limit where the hypoeutectic aluminum silicon alloys do not, thus making the hypereutectic alloys suitable for use as connecting rods in two-cycle internal combustion engines.

In general, the hypereutectic aluminum-silicon alloys contain by weight from 12% to 30% silicon, 0.4% to 1.0% magnesium, less than 1.45% iron, less than 0.3% manganese, less than 0.37% copper, and the balance aluminum.

More particularly, a suitable hypereutectic aluminum-silicon alloys is that described in U.S. Pat. No. 4,969,428 having the following composition in weight percent:

| | |
|---|---|
| Silicon | 20.0–30.0% |
| Magnesium | 0.4–6.6% |
| Iron | Less than 1.45% |
| Manganese | Less than 0.30% |
| Copper | Less than 0.25% |
| Aluminum | Balance |

Alternately, the hypereutectic aluminum-silicon alloy can have the following composition, as described in U.S. Pat. No. 4,821,694, in weight percent:

| | |
|---|---|
| Silicon | 16.0–19.0% |
| Magnesium | 0.4%–0.7% |
| Iron | Less than 1.4% |
| Manganese | Less than 0.3% |
| Copper | Less than 0.37% |
| Aluminum | Balance |

FIG. 2 is a curve showing cycles-to-failure as compared to the stress of a hypereutectic aluminum-silicon alloy containing 19.0% silicon, 0.75% magnesium, 0.25% iron, 0.15% manganese, 0.10% copper, and balance aluminum. While the ultimate tensile strength of this alloy is less than hypoeutectic aluminum-silicon alloys, the curve flattens out at high cycles, indicating that the alloy has an endurance limit, so that if the stress is maintained at a value less than about 15,000 psi, the alloy will not fail under cycling.

It is believed that the high cycle fatigue strength in the hypereutectic aluminum-silicon alloy is achieved because of the micro-structure. These alloys are characterized by primary silicon particles embedded in a eutectic matrix, with the eutectic matrix being made up of two continuous phases, one of silicon with a modulus of $17 \times 10^6$ psi and a second phase of aluminum with a modulus of $10 \times 6^6$ psi. It is believed that since the eutectic silicon phase is fibrous and has a modulus higher than that of the eutectic aluminum phase, it reinforces the aluminum at low stress and carries the load in place of the aluminum. As a result, at low stress levels, the high cycle fatigue properties are determined by the eutectic silicon phase and not by the aluminum phase, as in a hypoeutectic alloy, and this results in the hypereutectic alloy having a true endurance limit below about a 15,000 psi stress level. This means that the alloy will not fail, regardless of the number of cycles, if the stress or load is maintained at a level beneath about 15,000 psi.

As previously noted, a connecting rod for a two-cycle internal combustion engine is not subjected to tensile strength, but only compressive stress. Thus, the fact that the hypereutectic alloy has a lower ultimate tensile strength than the hypoeutectic aluminum-silicon alloys is of no appreciable significance when dealing with connecting rods. But the fact that the hypereutectic aluminum-silicon alloys quite unexpectedly show an endurance limit is significant when dealing with connecting rods. Thus, while the hypoeutectic aluminum-silicon alloys are not suitable for use as connecting rods due to their poor high cycle fatigue strength, the hypereutectic aluminum-silicon alloys, due to their showing of an endurance limit below a 15,000 psi stress level, can be used as connecting rods for two-cycle engines.

It has been further discovered that the particle size of the precipitated primary silicon particles has no appreciable effect on the high cycle fatigue properties of the hypereutectic aluminum-silicon alloy, but it does effect the ultimate tensile strength. The larger the size of the primary silicon particles, the lower the ultimate tensile strength. Because of this, it is preferred to maintain the average particle size of the precipitated silicon particles in the alloy, when used as a connecting rod in a two-cycle engine, below 50 microns, and preferably below 20 microns.

Various modes of carrying out the invention are contemplated as being within the scope of the following claims particularly pointing out and distinctly claiming the subject matter which is regarded as the invention.

We claim:

1. In a two-cycle internal combustion engine, an engine block having at least one cylinder, a piston slidable within the cylinder, and a connecting rod connected to said piston, said connecting rod being composed of a hypereutectic aluminum-silicon alloy containing by weight from 12% to 30% silicon, 0.4% to 1.0% magnesium, less than 1.45% iron, less than 0.3% manganese, less than 0.37% copper, and the balance aluminum.

2. The engine of claim 1, wherein said alloy contains precipitated particles of primary silicon having an average particle size less than 50 microns.

3. The engine of claim 2, wherein the average particle size is less than 20 microns.

4. The engine of claim 1, wherein said alloy has an endurance limit below a stress of about 15,000 psi.

5. The engine of claim 1, wherein said alloy has the following composition in weight per cent:

| Silicon | 20.0–30.0% |
| Magnesium | 0.4–1.6% |
| Iron | Less than 1.45% |
| Manganese | Less than 0.30% |
| Copper | Less than 0.25% |
| Aluminum | Balance. |

6. The engine of claim 1, wherein the alloy has the following composition in weight percent:

| Silicon | 16.0–19.0% |
| Magnesium | 0.4–0.7% |
| Iron | Less than 1.45% |
| Manganese | Less than 0.3% |
| Copper | Less than 0.37% |
| Aluminum | Balance. |

7. In an internal combustion engine, a two-cycle engine block having at least one cylinder, a piston slidable within the cylinder and a connecting rod connected to the piston, said connecting rod consisting essentially of 12% to 30% silicon, 0.4% to 1.0% magnesium, less than 1.45% iron, less than 0.3% manganese, less than 0.37% copper, and the balance aluminum, said alloy containing precipitated particles of primary silicon having an average particle size less than 50 microns and said alloy having an endurance limit below a stress of about 15,000 psi.

* * * * *